(12) United States Patent
Bucheru

(10) Patent No.: US 12,098,696 B2
(45) Date of Patent: Sep. 24, 2024

(54) SYSTEMS AND METHODS FOR INTERLEAVED SYNCHRONOUS PROPELLER SYSTEM

(71) Applicant: Bogdan Tudor Bucheru, Lakeway, TX (US)

(72) Inventor: Bogdan Tudor Bucheru, Lakeway, TX (US)

(*) Notice: Subject to any disclaimer, the term of this patent is extended or adjusted under 35 U.S.C. 154(b) by 0 days.

(21) Appl. No.: 18/207,003

(22) Filed: Jun. 7, 2023

(65) Prior Publication Data

US 2023/0323853 A1    Oct. 12, 2023

Related U.S. Application Data

(63) Continuation of application No. 17/708,252, filed on Mar. 30, 2022, now abandoned.

(60) Provisional application No. 63/183,878, filed on May 4, 2021.

(51) Int. Cl.
| | | |
|---|---|---|
| B64C 27/08 | (2023.01) | |
| B64C 11/50 | (2006.01) | |
| F03D 1/02 | (2006.01) | |
| F03D 13/20 | (2016.01) | |

(52) U.S. Cl.
CPC ............. *F03D 1/02* (2013.01); *B64C 11/50* (2013.01); *B64C 27/08* (2013.01); *F03D 13/20* (2016.05); *F05B 2240/37* (2020.08); *F05B 2240/912* (2013.01)

(58) Field of Classification Search
CPC .................................................. B64C 27/08
See application file for complete search history.

(56) References Cited

U.S. PATENT DOCUMENTS

| | | | | |
|---|---|---|---|---|
| 2,445,354 | A * | 7/1948 | Hoppes | B64C 27/12 244/17.23 |
| 2,540,404 | A * | 2/1951 | Neale | B64C 27/08 244/17.11 |
| 2,571,662 | A * | 10/1951 | Black | B64C 27/08 244/6 |
| 3,409,248 | A * | 11/1968 | Bryan | B64C 29/0025 244/6 |
| 8,393,866 | B2 * | 3/2013 | Thomassey | B64C 27/12 416/34 |
| 10,343,770 | B2 * | 7/2019 | Mullins | B64C 27/14 |
| 10,518,873 | B2 * | 12/2019 | Netzer | B64D 47/08 |
| 10,564,648 | B2 * | 2/2020 | Hein | B64C 29/02 |
| 10,674,080 | B2 * | 6/2020 | Palmer | H04N 23/57 |
| 2019/0270516 | A1 * | 9/2019 | Sinusas | B64C 27/00 |
| 2022/0126990 | A1 * | 4/2022 | Yang | B64C 27/473 |
| 2022/0412302 | A1 * | 12/2022 | Bucheru | F03D 13/20 |
| 2023/0323853 | A1 * | 10/2023 | Bucheru | F03D 1/02 416/120 |

\* cited by examiner

*Primary Examiner* — Christopher R Legendre
(74) *Attorney, Agent, or Firm* — Pierson IP, PLLC

(57) ABSTRACT

A system with a first turbine rotating in a first direction and a second turbine rotating in a second direction, wherein there is negative clearance associated with blades of the first turbine and the blades of the second turbine.

5 Claims, 10 Drawing Sheets

SYSTEMS AND METHODS FOR INTERLEAVED SYNCHRONOUS PROPELLER SYSTEM

BACKGROUND INFORMATION

Field of the Disclosure

Examples of the present disclosure are related to systems and methods for an interleaved synchronous propeller system. More particularly, embodiments disclose a system with a first turbine rotating in a first direction and a second turbine rotating in a second direction, wherein there is negative clearance between the blades of the first turbine and second turbine.

Background

Wind turbines are devices that convert kinetic energy of the wind into electrical energy. To increase an amount of electrical energy produced by wind turbine farms either the sizes of the wind turbines need to be increased or a number of the wind turbines needs to be increased.

Although smaller wind turbines are easier to manufacture, to match a power output of a wind turbine farm with larger wind turbines a wind turbine farm with smaller wind turbines require a larger number of wind turbines, a greater physical footprint, more maintenance, and have greater operating costs. On the other hand, larger wind turbines are more expensive to manufacture and transport.

Situations may arise where it is desirable for a windfarm to increase the electrical energy produced while decreasing the physical footprint occupied by the turbines.

Accordingly, needs exist for more effective and efficient systems and methods associated with an interleaved synchronous propeller system that includes a first turbine that rotates in a first direction and a second turbine that rotates in a second direction, wherein there is negative clearance associated with blades of the first turbine and second turbine.

SUMMARY

Embodiments described herein disclose an interleaved synchronous propeller system with turbine blades associated with different turbines occupying the same space while rotating in different directions. The rotating turbine blades of the different turbines may have air turbulences that aligned within a shared area in three dimensional space in multiple axis. Herein after, the terms turbine, propeller, and blades may be used interchangeably. The blades associated with the different turbines may have synchronized angles with the same revolutions per minute, wherein the synchronized angles are offset from each other. This may allow the different turbines to be simultaneously used in the same space. More so, embodiments may utilize a synchronous propeller system wherein turbines are aligned in a vertical and/or horizontal axis.

Embodiments may include a first wind turbine and a second wind turbine.

The first wind turbine and the second wind turbine may each have the same number of turbine blades, wherein a length of the turbines may be equal. The first wind turbine and the second wind turbine may be positioned along a lateral axis or longitudinal axis, wherein the lateral or longitudinal axis includes air turbulences created by both turbines. A distance from a first axis of rotation associated with the first wind turbine to a second axis of rotation associated with the second wind turbine may be greater than a length of one of the turbine blades but less than double the length of one of the turbine blades. When the two turbines are both in simultaneously use, negative clearance is created between the first axis of rotation and the second axis of rotation. In embodiments, the lateral axis may be in a horizontal axis extending in parallel to a ground surface and the longitudinal axis may be a vertical axis extending in a perpendicular direction to the ground surface.

In embodiments, the turbine blades of the first wind turbine may be configured to rotate in a first direction and turbine blades of the second wind turbine may be configured to rotate in a second direction, wherein the first direction and second directions are opposite directions. The turbine blades of the first wind turbine may be configured to rotate within the negative clearance at a first speed, and the turbine blades of the second wind turbine are configured to rotate within the negative clearance at the first speed.

Furthermore, rotation of the turbine blades of the first wind turbine may be synchronized to the rotation of the turbine blades of the second wind turbines, such that the turbine blades do not contact each other while moving through the negative clearance. The synchronization of the turbine blades of the first wind turbine and the turbine blades of the first wind turbines may allow the turbine blades to be interleaved while moving through the same space.

In embodiments, the first wind turbine and the second wind turbine may be mounted onto the same post, which may minimize a footprint of the multiple turbines and the ground surface, while increase the working areas associated with the multiple turbines. The single post may also have zero total torque due to the interleaved synchronous movement of the turbine blades associated with the first wind turbine and the second wind turbine. Furthermore, utilizing a single post to operate multiple wind turbines may allow the multiple wind turbines to be coupled to a single generator.

In further embodiments, three or more wind turbines may be positioned on a single post. Wherein blades associated with a first wind turbine rotate in a first direction, while the blades of a second and third wind turbines rotate in a second direction, wherein the second and third wind turbines are adjacent to the first wind turbine and the first wind turbine may be a center wind turbine. The blades of the adjacent wind turbines may be synchronized and interleaved with the blades of the first wind turbine. In embodiments, the angular position of the blades of the adjacent wind turbines may be identical. In further embodiments, the second wind turbine may be adjacent to the first wind turbine along a lateral axis, and the third wind turbine may be adjacent to the first wind turbine along a longitudinal axis.

Embodiments may also include four or more wind turbines, where the blades of each of the adjacent wind turbines rotate in different directions and are interleaved together within negative space.

Specific embodiments may include interleaved synchronous propeller system for a vehicle including a body that is configured to lift of a ground surface; first blades positioned on a first axis, the first blades being configured to be coupled to an upper surface of the body, the first blades being configured to rotate in a first direction at a first speed around a first axis of rotation; second blades positioned on the first axis, the second blades being configured to be coupled to the upper surface of the body, the second blades being configured to rotate in a second direction at the first speed around a second axis of rotation; wherein negative clearance is created on the first axis above the upper surface of the body between the first axis of rotation and the second axis of rotation.

In further embodiments, a tail rotor configured for yaw control of the vehicle, the tail rotor being configured to rotate around a third axis of rotation, the third axis of rotation being perpendicular to the second axis of rotation.

In further embodiments, there may be clearance between the second blades and the tail rotor.

In further embodiments, the tail rotor is not positioned on the first axis.

In further embodiments, the first blades are configured to extend past a front of the body, and the second blades do not extend past the front of the body nor a rear of the body.

In further embodiments, a first distance from the front end to the first axis of rotation is less than a second distance from the rear end to the second axis of rotation.

In further embodiments, the first axis of rotation is positioned above a cabin of the vehicle, wherein people are configured to sit within the cabin.

In further embodiments, the second axis of rotation is positioned above a tail boom of the vehicle, wherein a first width of the tail boom is smaller than a second width of the body, wherein the tail boom extends from the body to the tail rotor.

In further embodiments, the vehicle is a helicopter.

In further embodiments, the first blades and the second blades are configured to give lift and thrust on both sides of the body.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
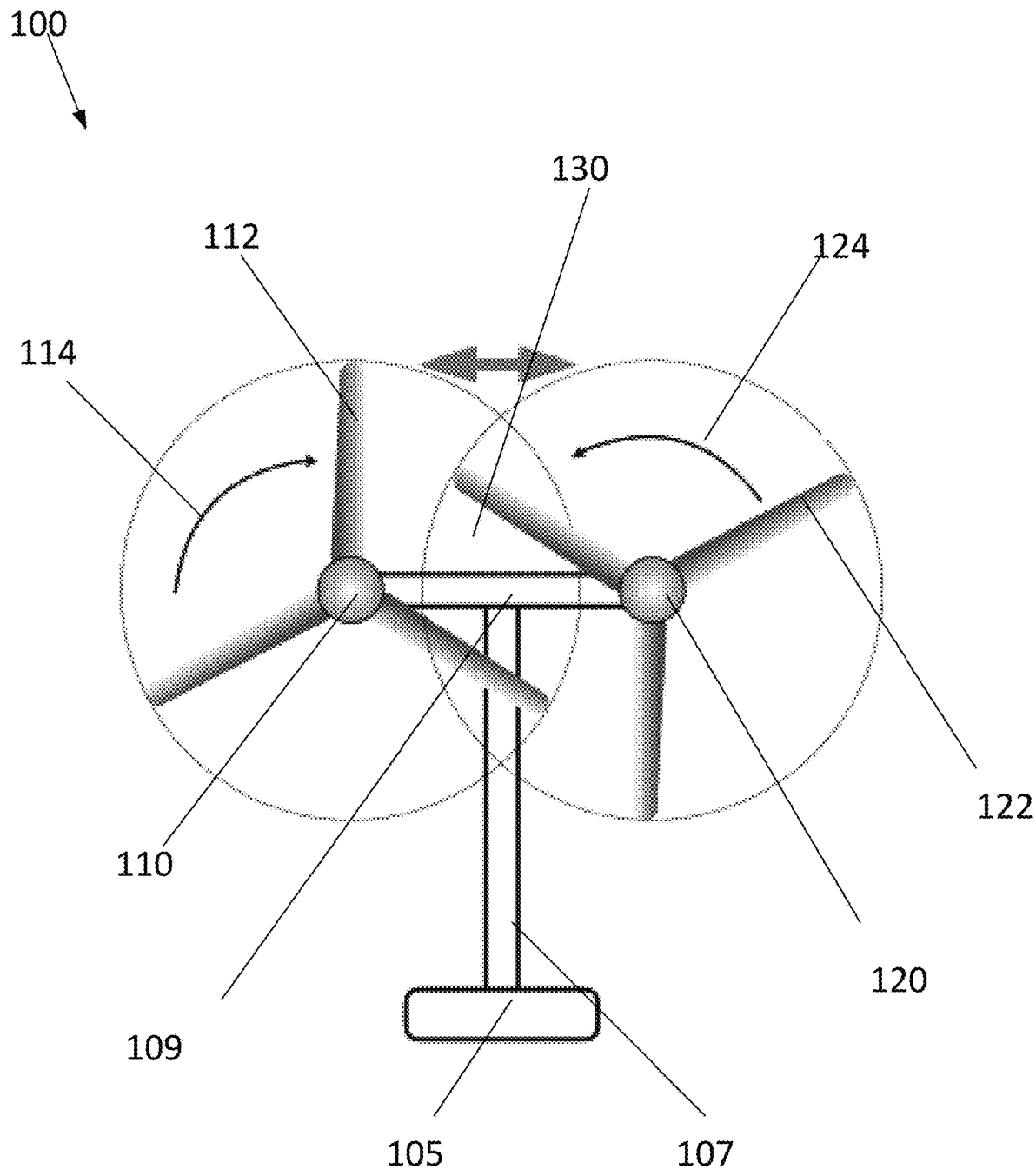
FIG. 1 depicts an interleaved wind turbine system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

FIG. 1 depicts an interleaved wind turbine system 100, according to an embodiment. Wind turbine system 100 may include a support structure 105, first wind turbine 110, and second wind turbine 120.

Support structure 105 may be a foundation of wind turbine system 100, and be configured to support the elements of wind turbine system 100. In embodiments, support structure 105 may include a foundation that is configured to be directly positioned within the ground or positioned within water. In further embodiments, support structure 105 may be configured to be embedded within a housing, such as a turbine for a vehicle. Support structure 105 may include tower 107 and beam 109.

Tower 107 may be a vertical shaft extending from a bottom of a foundation upward. In other embodiments, tower 107 may be any beam extending along a first axis. A height associated with tower 107 may be at least as long as a length of the blades of first wind turbine 110 and second wind turbine 120. This may allow for a minimum clearance to a ground surface.

Beam 109 may be a horizontal shaft extending from a first axis of rotation of first wind turbine 110 to a second axis of rotation of second wind turbine 120. In embodiments, beam 109 may be configured to extend along a second axis, wherein the second axis is perpendicular to the first axis. In embodiments a length of beam 109 may be at least as long as the length of the blades of first wind turbine 110 and second wind turbine 120. However, a distance between the first axis of rotation and the second axis of rotation may be less than double the length of the blades of first wind turbine 110 and second wind turbine 120. This may reduce a horizontal footprint occupied by wind turbine system 100. In embodiments, beam 109 may be positioned orthogonal to tower 107. However, in other embodiments beam 109 may be positioned in various angles, or with multiple sections that allow for multiple interleaved synchronize wind turbines. For example, beam 109 may be shaped as a square, circle, W, V, etc.

First wind turbine 110 may be configured to rotate a rotor, which spins a first generator to create electrical energy from mechanical energy. First wind turbine 110 may include a plurality of first blades 112 that are equally angularly offset from each. First blades 112 may be configured to rotate in a first direction 114 to rotate the rotor. First blades 112 may be configured to rotate about a first fixed axis that is aligned with beam 109. Responsive to first blades 112 rotating, first blades 112 may cause air turbulence. First blades 112 may have an outer profile with depressions, grooves, curvatures, bends, tapering, etc. that assists in rotating the first blades 112 in the first direction 114. In embodiments, first blades 112 may be configured to rotate at a first speed with a first revolutions per minute.

Second wind turbine 120 may be configured to rotate a rotor, which spins the first generator to create electrical energy from mechanical energy. Second wind turbine 120 may include a plurality of second blades 114 that are equally angularly offset from each. In embodiments, first wind turbine 110 may have the same number of blades as second wind turbine 120. Second wind turbine 120 may be configured to rotate in a second direction 124 to rotate the rotor. Second blades 122 may be configured to rotate about a second fixed axis that is aligned with beam 109, and offset from the first axis along beam 109. Responsive to second blades 122 rotating, second blades 122 may cause air turbulence. Second blades 122 may have an outer profile with depressions, grooves, curvatures, bends, tapering, etc. that assists in rotating the second blades 122 in the second direction 124. In embodiments, second blades 122 may be configured to rotate at the first speed with the first revolutions per minute. In embodiments, first blades 112 and second blades 122 may have a same length, and there may be an equal number of first blades 112 and second blades 122.

In embodiments, although the first axis of rotation of the first wind turbine 110 may be aligned with the second axis of rotation of second wind turbine 120 along beam 109, the rotation of first blades 112 may or may not be coplanar with second blades 122. As such, a first point of rotation of the first wind turbine 110 along a lateral axis may be in front of, behind, or coplanar to a second point of rotation of the second wind turbine 120 along the lateral axis. Furthermore, the first point of rotation of the first wind turbine 110 and the second point of rotation of the second wind turbine 120 may be along a same vertical plane and longitudinal plane. Accordingly, the point of rotation of the second wind turbine may be offset from the point of rotation of the first wind turbine in multiple axis while being aligned in at least one axis.

In embodiments, a first axis of rotation of first blades 112 may be positioned at a distance from a second axis of rotation of second blades 122 that is greater than the length of first blades 112 and less than double the length of first blades 112. This relative positioning of first blades 112 and second blades 122 causes the rotation of first blades 112 and second blades 122 to have negative clearance 130. In other words, portions of the circular path taken by first blades 112 may over laps the circular path taken by second blades 122 in three dimensional space along the vertical, longitudinal, and lateral axis. In other embodiments, the first air turbulences created by first blades 112 may overlap second air turbulences created by second blades 122 within the negative clearance.

The rotation of first blades 112 may be synchronized with the rotations of second blades 122 such that the first blades 112 do not contact the second blades 122 when rotating through the negative clearance 130. Accordingly, the rotation of the first blades 112 may be synchronized out of phase from the rotation of the second blades 122, while the revolutions per minute of the first blades 112 and second blades 122 is equal.

Figure 2:
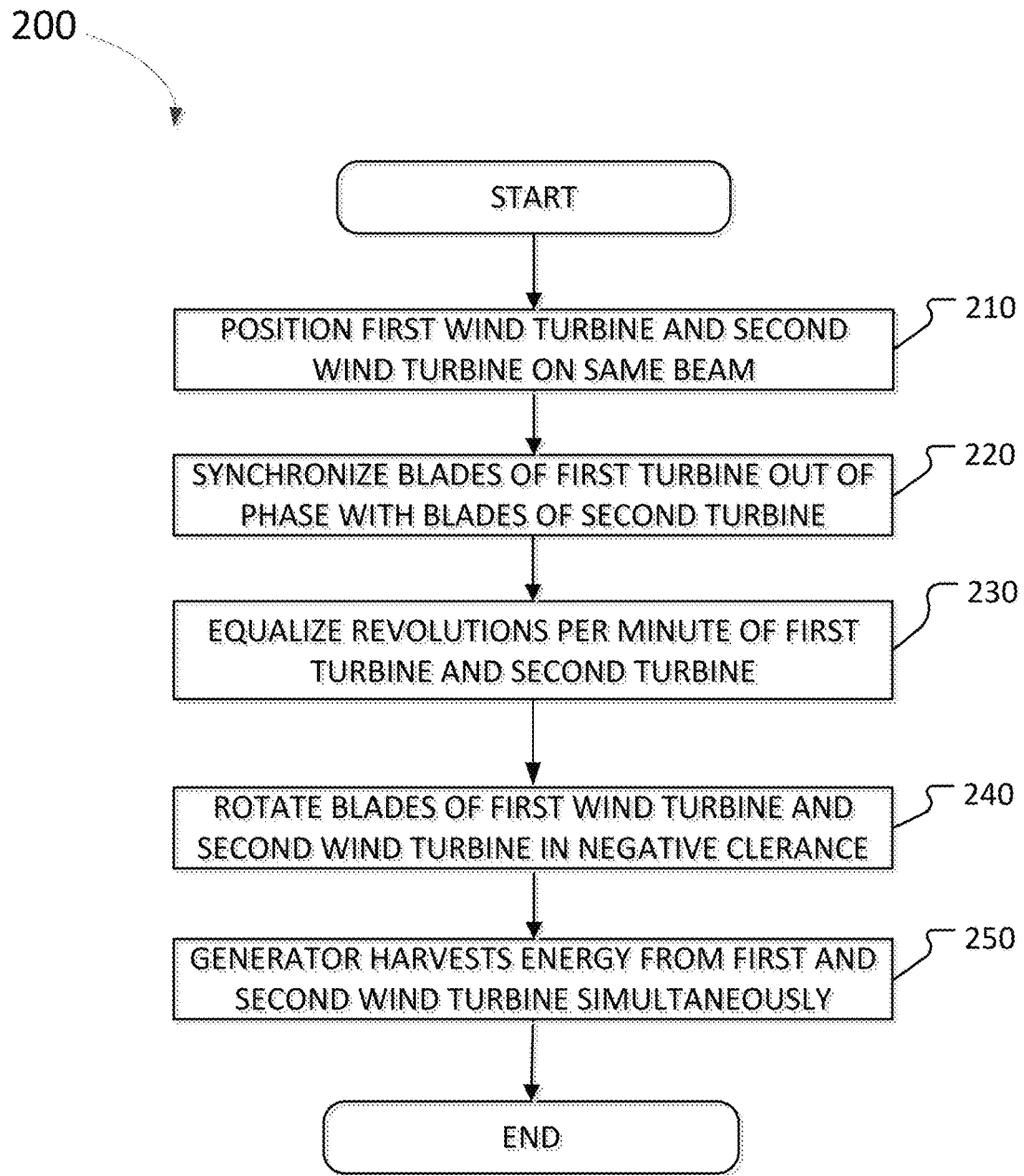
FIG. 2 depicts a method for an interleaved synchronous system for wind turbines, according to an embodiment.

FIG. 2 depicts a method 200 for an interleaved synchronous system for wind turbines, according to an embodiment. The operations of the method depicted in FIG. 2 are intended to be illustrative. In some embodiments, the method may be accomplished with one or more additional operations not described, and/or without one or more of the operations discussed. Additionally, the order in which the operations of the method are illustrated in FIG. 2 and described below is not intended to be limiting. Elements depicted in FIG. 2 may be described above. For the sake of brevity, a further description of these elements is omitted.

At operation 210, a first wind turbine and a second wind turbine may be positioned on a same beam of a support structure along a first axis. The first wind turbine and the second wind turbine may be positioned a given distance from each other on the beam such that their blades have negative clearance in a plane aligned with the beam.

At operation 220, a phase of the blades associated with the first wind turbine may be offset from a phase of the blades associated with the phase of the second wind turbines. The phase of the first blades and the second blades may be offset at a fixed angle, such that the two blades never interfere with each other.

At operation 230, a rotational speed of the blades associated with the first wind turbines may be equal to that of the blades associated with the blades of the second wind turbine.

At operation 240, due to the speed of the blades of the first wind turbine and the second wind turbine being equal to each other while also being out of phase, the blades of the first wind turbine may rotate in a first direction through the negative clearance in a first direction out of phase of the blades of the second wind turbine rotate in a second direction through the second direction.

At operation 250, a generator may simultaneously harvest energy from the first wind turbine and the second wind turbine.

Figure 3:
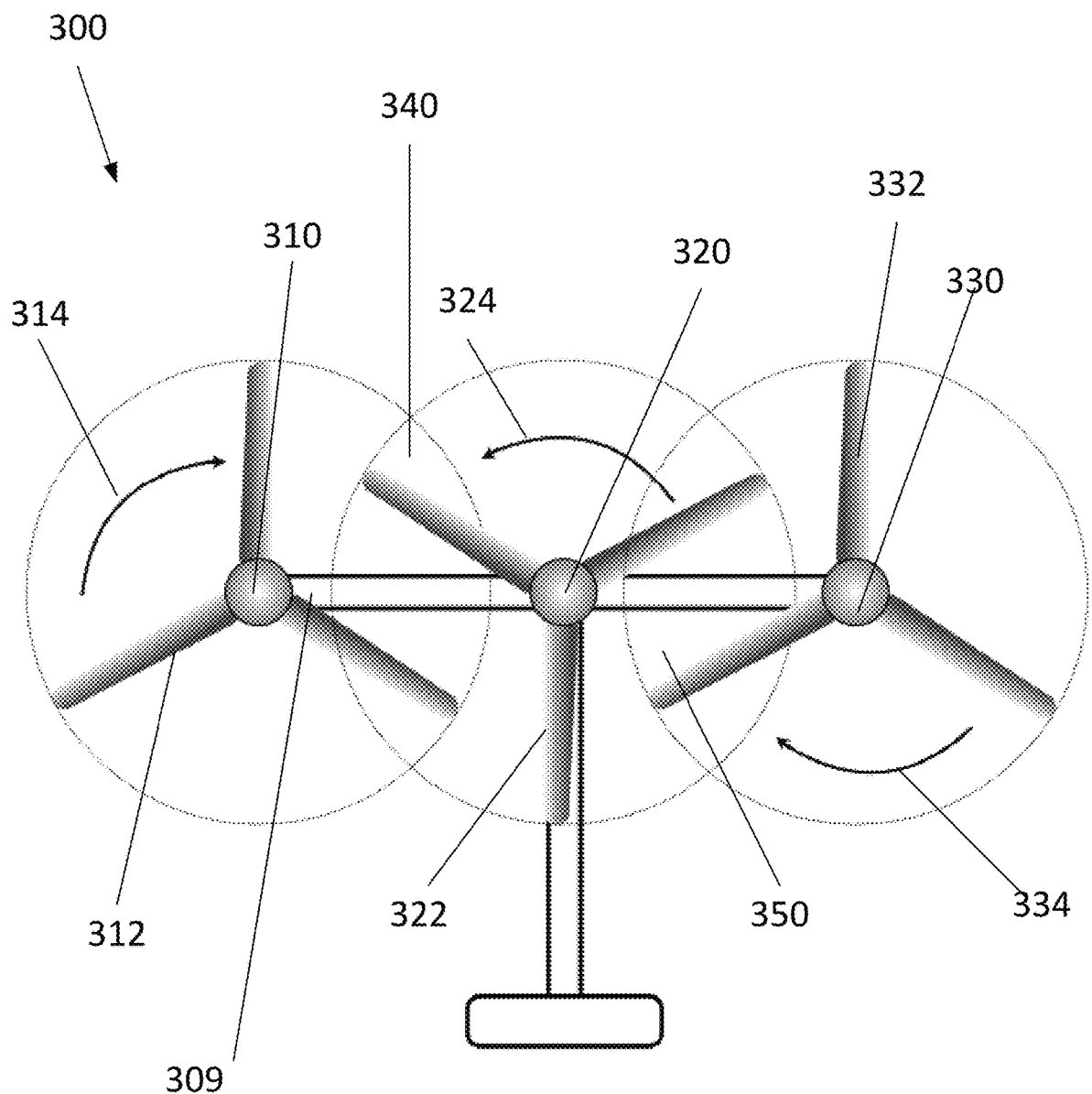
FIG. 3 depicts an interleaved wind turbine system, according to an embodiment.

FIG. 3 depicts an interleaved wind turbine system 300, according to an embodiment. Elements depicted in FIG. 3 may be described above, and for the sake of brevity another description of these elements may be omitted.

Wind turbine system 300 may have an odd number of wind turbines, and include a first wind turbine 310 with first blades 312, a second wind turbine 320 with second blades 322, and a third wind 320 turbine blades 332. First blades 312, second blades 322, and third blades 332 may have the same length, and there may be a same number of first blades 312, 322, and third blades 332.

Each of the wind turbines 310, 320, 330 may be mounted on a same post 309, wherein post 309 may be positioned in parallel to a ground surface. In configurations with an odd number of wind turbines, a center wind turbine, such as second wind turbine 320 may be positioned in the middle of post 309. The middle of post 309 may be equidistance from both first wind turbine 310 and third wind turbine 330.

The center wind turbine, such as second wind turbine 320, may be configured to rotate in a first direction 324. The wind turbines positions adjacent to the center wind turbine, such as first wind turbine 310 and third wind turbine 330, may be configured to rotate in a second direction 314, wherein the first direction 324 and second direction 314 may be opposite directions. In embodiments, with an odd number of wind turbines, the central wind turbine may always rotate in a different direction than its adjacent wind turbines. The distance between the center wind turbine and the adjacent wind turbines may be greater than a length of one of its blades, but less than double the length of one of its blades. This may create a first negative clearance 340 positioned between first wind turbine 310 and second wind turbine 320, and a second negative clearance 350 positioned between first wind turbine 310 and second wind turbine 320.

In embodiments, the first blades 312 and third blades 332 may be configured to rotate in phase at a first revolutions per minute. The second blades 322 may rotate at the first revolutions per minute in a phase that is offset from the phase of the first blades 312 and third blades 332. This may allow the first blades 312 and third blades 332 to rotate within the negative clearances 340, 350 between the second blades without impact each other.

In embodiments, with an odd number of blades on a same line may result in a non-zero torque result. This may be due to more blades rotating in a first direction than in a second direction.

Figure 4:
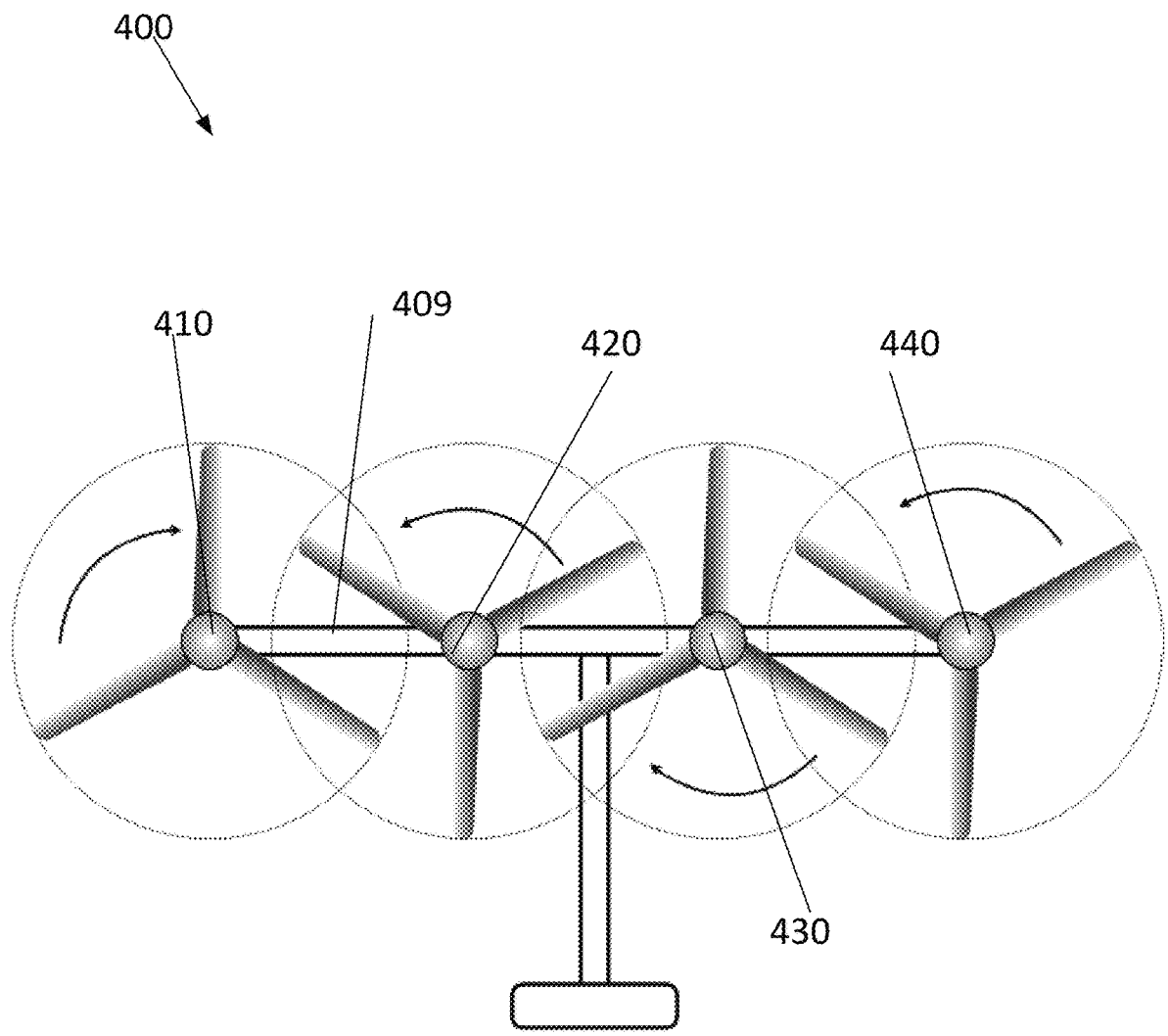
FIG. 4 depicts an interleaved wind turbine system, according to an embodiment.

FIG. 4 depicts an interleaved wind turbine system 400, according to an embodiment. Elements depicted in FIG. 4 may be described above, and for the sake of brevity another description of these elements may be omitted.

System 400 utilizes an even number of wind turbines 410, 420, 430, 440 positioned along a same pole 430. Adjacent wind turbines may be configured to rotate in opposite directions within a negative clearance, wherein each of the wind turbines 410, 420, 430, 440 may rotate in at a same revolutions per minute. Furthermore, each of the wind turbines 410, 430 rotating in a first direction may be in phase with each other, while each of the wind turbines 420, 440 rotating in a second direction may be in phase with each other. However, each of the wind turbines 410, 430 rotating in the first direction may be out of phase with each of the wind turbines 420, 440 rotating in the second direction. This may allow adjacent wind turbines to rotate within multiple negative spaces with different independent turbines simultaneously without contacting the blades of the adjacent wind turbines.

In embodiments, with an even number of blades on a same line may result in a zero torque result. This may be due to a same number of blades rotating in a first direction and in a second direction.

Figure 5:
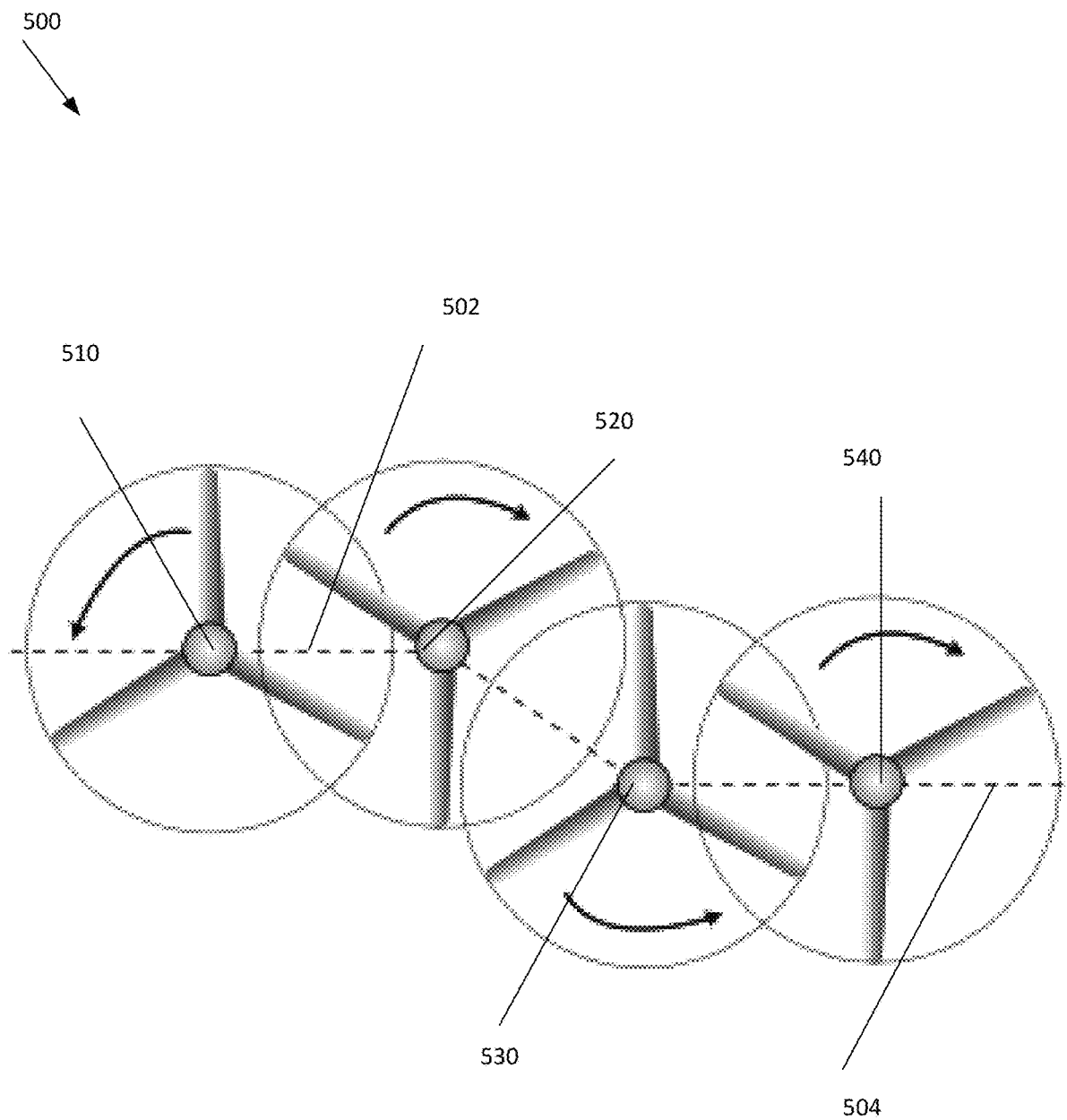
FIG. 5 depicts a dual line wind turbine system, according to an embodiment.

FIG. 5 depicts a dual line wind turbine system 500, according to an embodiment. Elements depicted in FIG. 5 may be described above, and for the sake of brevity another description of these elements may be omitted.

As depicted in FIG. 5 wind turbine system 500 may include multiple wind turbines 510, 520 positioned on a first axis 502 and multiple wind turbines 530, 540 positions on a second axis 504, where the first axis 502 and second axis 504 may be perpendicular to each other. In systems with multiple axis 502, 504 adjacent wind turbines, such as second wind turbine 520 and third wind turbine 530 may still rotate in opposite directions. This may allow a negative clearance between second wind turbine 520 and third wind turbine 530 with a center that is between the first axis 502 and the second axis 504.

Figure 6:
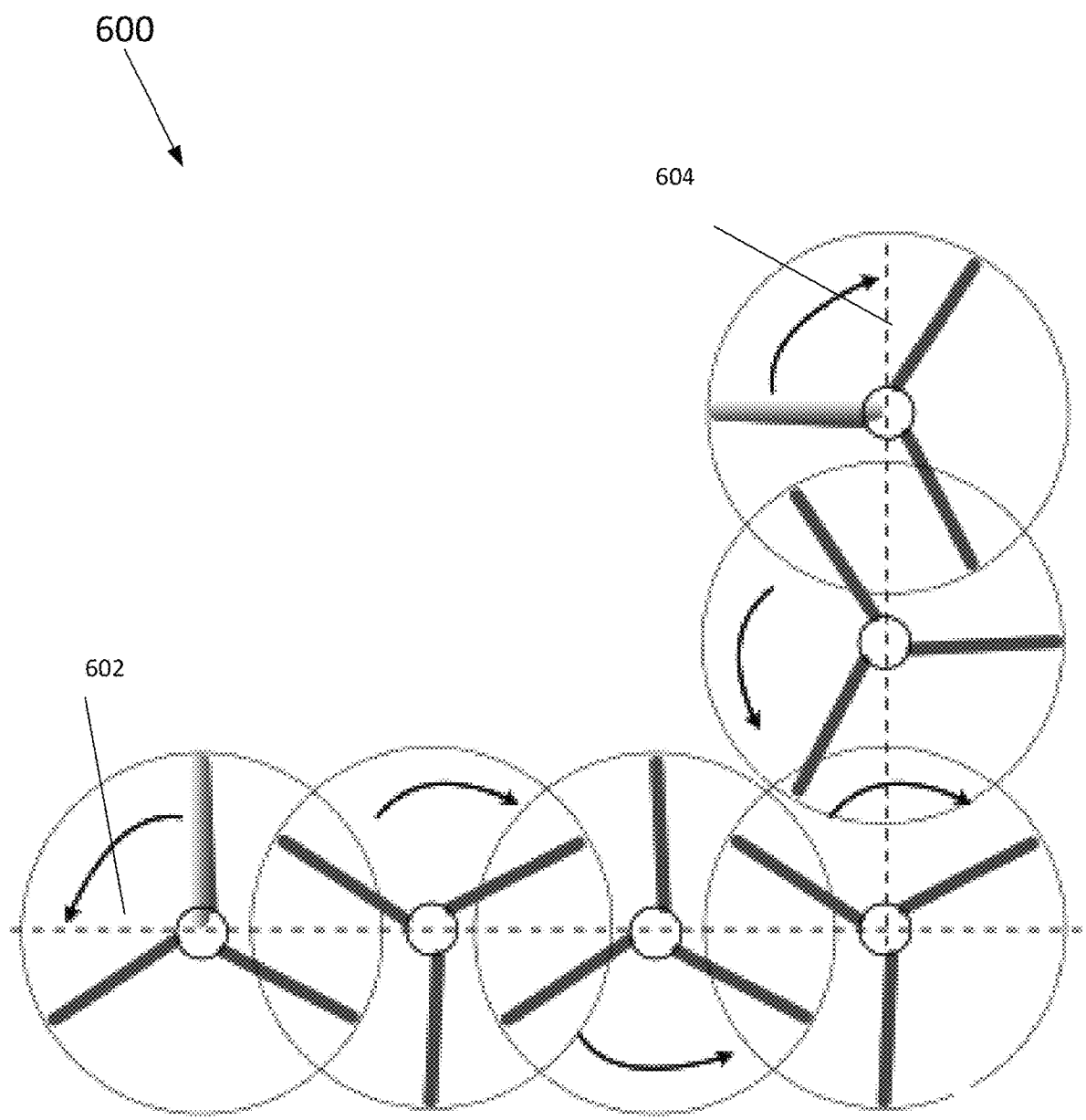
FIG. 6 depicts an angled wind turbine system, according to an embodiment.

FIG. 6 depicts an angled wind turbine system 600, according to an embodiment. Elements depicted in FIG. 6 may be described above, and for the sake of brevity another description of these elements may be omitted.

As depicted in FIG. 6, multiple wind turbines may be positioned on a first axis 602, and multiple wind turbines may be positioned on a second axis 604. In embodiments, the first axis 602 may be orthogonal to second axis 604, or at any tangential angle to create complex geometries.

Figure 7:
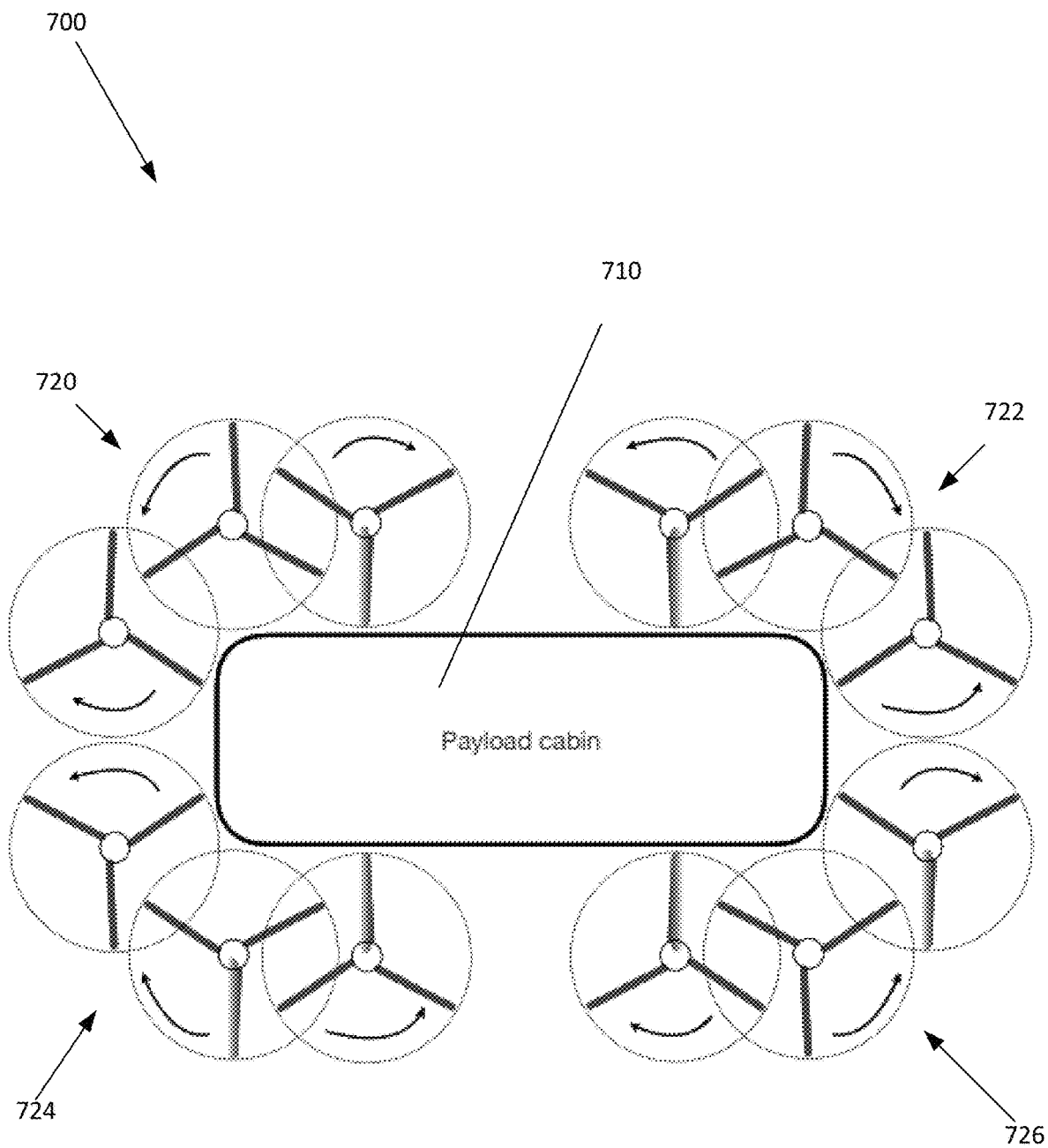
FIG. 7 depicts a multicopter system that is configured to move a payload, according to an embodiment.

FIG. 7 depicts a multicopter system 700 that is configured to move a payload, according to an embodiment. Elements depicted in FIG. 7 may be described above, and for the sake of brevity another description of these elements may be omitted.

Conventional multicopters utilize wind turbines or blades positioned at each corner of a payload cabin. Generally each of the blades will be utilized together to control the velocity and movement of the payload cabin. However, because conventional multicopters do not use multiple sets of turbines or blades rotating within the same space they require a large footprint.

As depicted in FIG. 7 a payload cabin 710 may be coupled to multiple sets of turbines 720, 722, 724, 726, wherein each set of turbines may be positioned at a different corner of payload cabin 710. Each of the sets of turbines 720, 722, 724, 726 may have an odd number of turbines with a different number of turbines rotating in a first direction than a second direction. Further, each of the adjacent sets of turbines 720, 722, 724, 726 may have a different number of turbines rotating in the first direction and the second direction, wherein sets or turbines 720 and 726, and 722 and 722 positioned diagonally across from each other may have a same number of turbines rotating in the first direction and the same number of turbines rotating in second direction.

By positioning sets of turbines 720, 722, 724, 726, with each set having multiple interleaved and synchronized blades, the footprint of system 700 may be smaller than that of a convention copter to produce the same level of control and velocity. Further, each of the interleaved propellers may be driven by a single motor.

Figure 8:
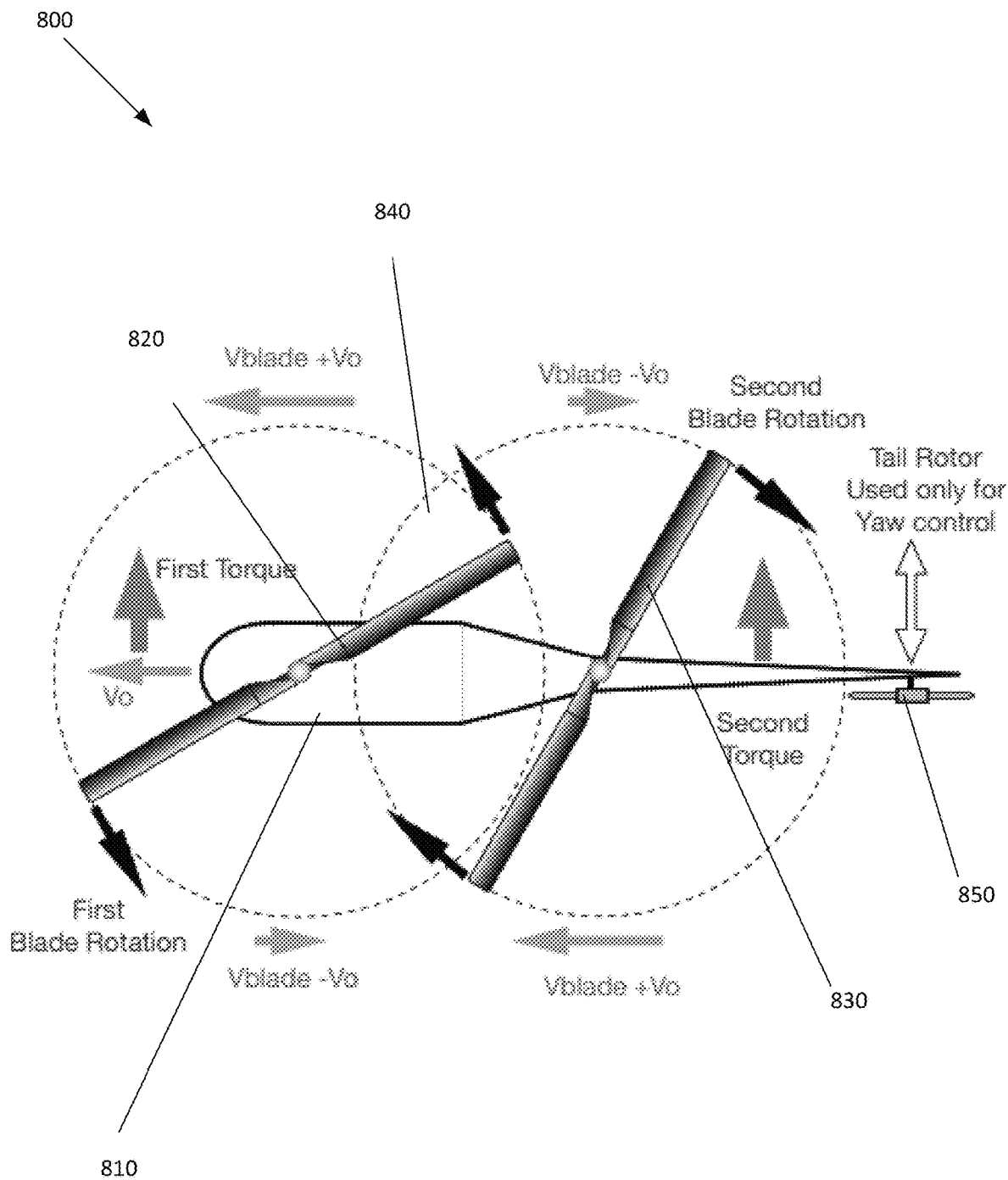
FIGS. 8 and 9 depict a first multicopter system and a second multicopter system that are configured to move a payload, according to an embodiment.
Figure 9:
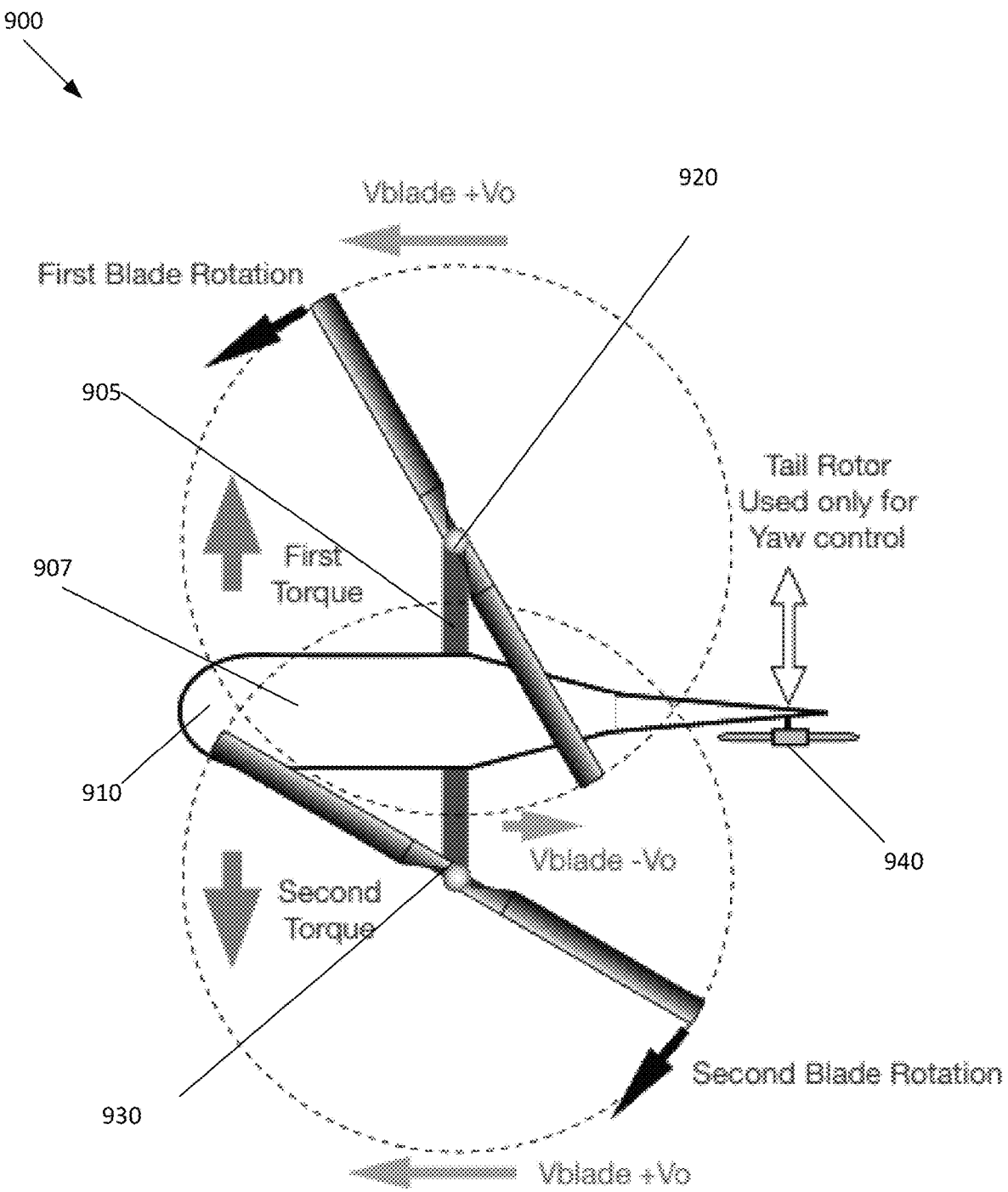

FIGS. 8 and 9 depict a first multicopter system 800 and a second multicopter system 900 that are configured to move a payload, according to an embodiment. Elements depicted in FIGS. 8 and 9 may be described above, and for the sake of brevity another description of these elements may be omitted.

Conventional helicopters utilize a large blade that rotates in a single direction, and a tail rotor to generate thrust compensate for torque. The tail rotor is necessary to zero out the torque acting upon the helicopter by the single rotor. Furthermore, a blade of a conventional helicopter is generally very large such that the blade extends past the front of the helicopter and close to the tail rotor. This creates a substantial footprint.

As depicted in FIG. 8, multicopter 800 may include first blades 820 and second blades 830 that are positioned in line with a central axis of helicopter body 810. First blades 820 and second blades 830 are configured to give lift and thrusts on both sides of a helicopter body 810, wherein first blades 820 and second blades 830 may be propellers. First blades 820 and second blades 830 may be inline blades that are configured to rotate within an interleaved negative space 840 above the helicopter body 810. When the first blades 820 are rotating the first blades 820 may extend past a front of helicopter body 810. When second blades 830 are rotating the second blades 820 may rotate behind first blades and in front of tail rotor 850. This may result in a smaller footprint of system 800 compared to a conventional copter while maintaining a same total blade area and lift. Further, the resulting torque from first blades 820 and second blades 830 may be zero, which may give lift and thrust on both sides of helicopter body 810 resulting in additional stability. This may enable a smaller tail rotor 850 to be used only for Yaw control. Additionally, due to second blades 830 rotating, there is less limitations on a maximum helicopter speed for helicopter body 810 due to system 800 having multiple, synchronized blades 820, 830 rotating.

As depicted in FIG. 9, multicopter 900 may include first blades 920 and second blades 930 that are positioned in line with a lateral axis of helicopter body 910. First blades 920 and second blades 930 may be positioned on a beam 905 that positioned an axis of rotation beyond the lateral axis of helicopter body 910, such that a majority of the interleaved negative space 907 utilized by first blades 920 and second blades 930 is positioned over and in line with the central axis of helicopter body 910.

Further, the circumference created by the rotation of first blades 920 and second blades 930 may not extend past a nose of helicopter body 910, which may reduce a length helicopter body 910 when compared to standard helicopters. Further, this may enable tail rotor 940 to be positioned closer to a nose of helicopter body 910 than in conventional helicopters.

Figure 10:
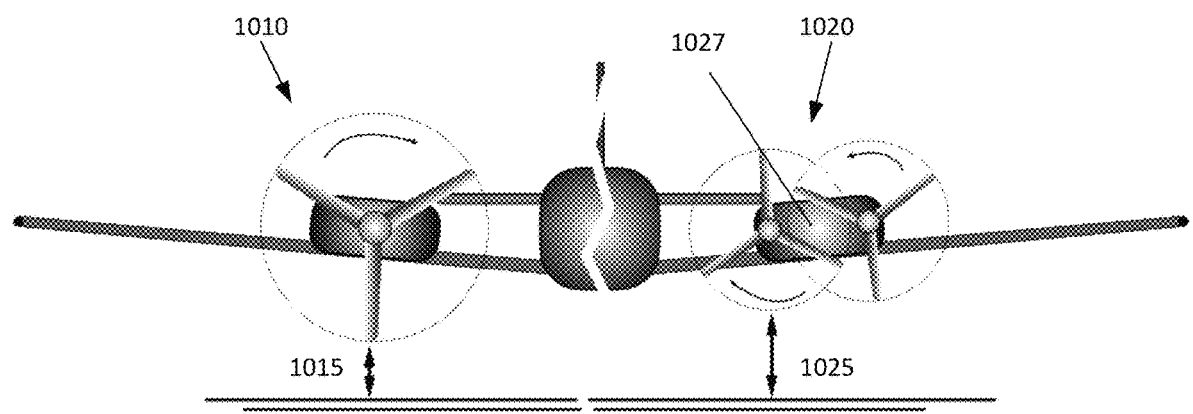
FIG. 10 depicts an airplane, according to an embodiment.

FIG. 10 depicts an airplane 1000, according to an embodiment. Elements depicted in FIG. 10 may be described above, and for the sake of brevity another description of these elements may be omitted.

More specifically, for demonstrative purposes, FIG. 10 depicts an airplane having a first wing 1010 with a conventional propeller, and a second wing 1020 having interleaved propellers. As depicted on first wing 1010, a ground clearance 1015 for conventional airplanes may be substantially smaller than that of ground clearance 1025 on second wing 1020 utilizing interleaved propellers. Due to the larger ground clearance 1025, shorter landing gear is possible with lower weight.

More so, the interleaved propellers on second wing 1020 may have the same total blade area as the single propeller on first wing 1010. However, due to interleaved negative space 1020 the apparent area occupied by the multiple blades may be less than that of the single blade on first wing 1010. This may reduce the risk of interaction with debris.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A interleaved synchronous propeller system for a vehicle comprising:
a body that is configured to lift off a ground surface, the body having a central axis extending from a front of the body to a rear of the body;
first blades positioned along the central axis, the first blades being configured to be coupled to an upper surface of the body, the first blades being configured to rotate in a first direction at a first speed around a first axis of rotation;
second blades positioned along the central axis, the second blades being configured to be coupled to the upper surface of the body, the second blades being configured to rotate in a second direction at the first speed around a second axis of rotation; wherein negative clearance is created along the central axis above the upper surface of the body between a rotational plane of the first blades and a rotational plane of the second blades wherein the first blades and second blades each have a first length, wherein the rotational plane of the first blades extends forward of the front of the body, and the second blades does not extend forward of the front of the body nor rearward of the rear of the body, the second axis of rotation is positioned closer to the first axis of rotation than the rear of the body, and the first axis of rotation is positioned closer to the front of the body than the second axis of rotation;
a tail rotor configured for yaw control of the vehicle, the tail rotor being configured to rotate around a third axis of rotation, the third axis of rotation being perpendicular to the second axis of rotation and positioned on a tail boom, wherein there is clearance between the rotational plane of the second blades and a rotational plane of the tail rotor, wherein the blades of the tail rotor have a second length, the second length being shorter than the first length, the second axis of rotation and the third axis of rotation being positioned on the tail boom.

2. The interleaved synchronous propeller system for the vehicle of claim 1, wherein the tail rotor is not positioned on the first axis.

3. The interleaved synchronous propeller system for the vehicle of claim 1, wherein the first axis of rotation is positioned above a cabin of the vehicle.

4. The interleaved synchronous propeller system for the vehicle of claim 1, wherein the vehicle is a helicopter.

5. The interleaved synchronous propeller system for the vehicle of claim 1, wherein the first blades and the second blades are configured to produce lift and thrust.

* * * * *